US011811921B2

(12) United States Patent
Baughman et al.

(10) Patent No.: US 11,811,921 B2
(45) Date of Patent: Nov. 7, 2023

(54) PHOTON-LEVEL LIGHT SHIFTING FOR ENHANCED FILE SYSTEM SECURITY AND AUTHENTICITY

(71) Applicant: International Business Machines Corporation, Armonk, NY (US)

(72) Inventors: Aaron K. Baughman, Cary, NC (US); Shikhar Kwatra, San Jose, CA (US); Iranna Dharmaraya Ankad, Bengaluru (IN); Craig M. Trim, Ventura, CA (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 17/460,234

(22) Filed: Aug. 29, 2021

(65) Prior Publication Data
US 2023/0065129 A1 Mar. 2, 2023

(51) Int. Cl.
*H04L 9/08* (2006.01)
*H04L 29/08* (2006.01)
(Continued)

(52) U.S. Cl.
CPC ............ *H04L 9/0852* (2013.01); *H04L 9/085* (2013.01); *H04L 9/0825* (2013.01); *H04L 67/06* (2013.01); *H04L 67/1097* (2013.01)

(58) Field of Classification Search
CPC ... H04L 9/085; H04L 63/0435; H04L 9/0852; H04L 63/126; H04L 9/0825; H04L 63/18; H04L 67/1097; H04L 67/06; H04L 63/061
See application file for complete search history.

(56) References Cited

U.S. PATENT DOCUMENTS

| 7,272,857 | B1 | 9/2007 | Everhart | |
| 7,359,512 | B1* | 4/2008 | Elliott | H04L 9/0858 380/263 |

(Continued)

FOREIGN PATENT DOCUMENTS

| CN | 106411521 A | * 2/2017 | ........... H04L 63/061 |
| CN | 107493168 B | 10/2019 | |

(Continued)

OTHER PUBLICATIONS

"Practical Image Encryption and Decryption by Phase-Coding Technique for Optical Security Systems" —Ohtsubo et al., Applied Optics vol. 41, No. 23, Aug. 10, 2002 https://opg.optica.org/ao/fulltext.cfm?uri=ao-41-23-4848&id=69664 (Year: 2002).*

(Continued)

*Primary Examiner* — Randy A Scott
(74) *Attorney, Agent, or Firm* — Van Leeuwen & Van Leeuwen; Edward J. Wixted

(57) ABSTRACT

An approach is provided in which the approach receives a request to upload a file at a server system that includes metadata encoded with a non-invertible key. The metadata includes contact information corresponding to an owner of the file. The approach establishes both a photon channel and a classical channel between the server system and a client system, which are both secured using one or more shared secret keys. The approach interfaces with the client system over the photon channel and the classical channel to decode the contact information at the server system, and sends an upload request from the server system to the owner of the file using the contact information. The approach authorizes the upload request at the server system in response to receiving an upload approval from the owner.

17 Claims, 7 Drawing Sheets

(51) Int. Cl.
   *H04L 67/1097* (2022.01)
   *H04L 67/06* (2022.01)

(56) References Cited

U.S. PATENT DOCUMENTS

| | | | |
|---|---|---|---|
| 8,477,947 | B2 | 7/2013 | Cho |
| 8,955,129 | B2 | 2/2015 | Cao |
| 9,659,185 | B2 | 5/2017 | Elovici |
| 10,791,286 | B2 | 9/2020 | Li |
| 2011/0134298 | A1 | 6/2011 | Aoyama |
| 2018/0109378 | A1* | 4/2018 | Fu .................. H04L 9/0897 |
| 2019/0361123 | A1 | 11/2019 | Miyazaki |

FOREIGN PATENT DOCUMENTS

| | | | |
|---|---|---|---|
| CN | 110489999 A | * | 11/2019 |
| CN | 106411521 B | | 2/2020 |
| KR | 101314210 B1 | | 10/2013 |

OTHER PUBLICATIONS

"Quantum Key Distribution with Two-Way Authentication" —Zheng et al., Optical and Quantum Electronics, Jun. 12, 2021 https://link.springer.com/article/10.1007/s11082-021-02845-8 (Year: 2021).*

Ohtsubo et al., "Practical image encryption and decryption by phase-coding technique for optical security systems." Applied optics 41.23 (2002): 4848-4855, Aug. 2002.

* cited by examiner

PHOTON-LEVEL LIGHT SHIFTING FOR ENHANCED FILE SYSTEM SECURITY AND AUTHENTICITY

BACKGROUND

Security and privacy is important in today's digital world. Security pertains to safeguarding user data whereas privacy pertains to safeguarding a user's identity. Internet piracy and illegal file sharing are amongst many cybercrimes that have been, and continue to be a concern. Internet piracy is the illegal act of distributing and or the reproduction of digital files that is traded over computer networks. These files include digital books, movies, PC games, hacked software, music and others.

File sharing is the practice of sharing computer data or space in a network on a computer network. Illegal file sharing is similar to internet piracy in terms of distributing illegal copies of certain files and products to others in a network. As the file is shared with the other party, the person receiving the file now has freedom to manipulate and/or trade the file with other users.

Classical computing refers to computing devices that manipulate ones and zeros to execute operations. Optical computing, or photonic computing, uses photons produced by lasers or diodes for computation. Photons have shown promise to enable a higher bandwidth than the electrons used in classical computing. Photonic logic is the use of photons (light) in logic gates and switching is obtained using nonlinear optical effects when two or more signals are combined. A photon is a small particle of light and is also referred to as a type of quantum (e.g., a tiny particle). Fiber-optic communication is a method of transmitting photons from one system to another system by sending pulses of infrared light through an optical fiber.

BRIEF SUMMARY

According to one embodiment of the present disclosure, an approach is provided in which the approach receives a request to upload a file at a server system that includes metadata encoded with a non-invertible key. The metadata includes contact information corresponding to an owner of the file. The approach establishes both a photon channel and a classical channel between the server system and a client system, which are both secured using one or more shared secret keys. The approach interfaces with the client system over the photon channel and the classical channel to decode the contact information at the server system, and sends an upload request from the server system to the owner of the file using the contact information. The approach authorizes the upload request at the server system in response to receiving an upload approval from the owner.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
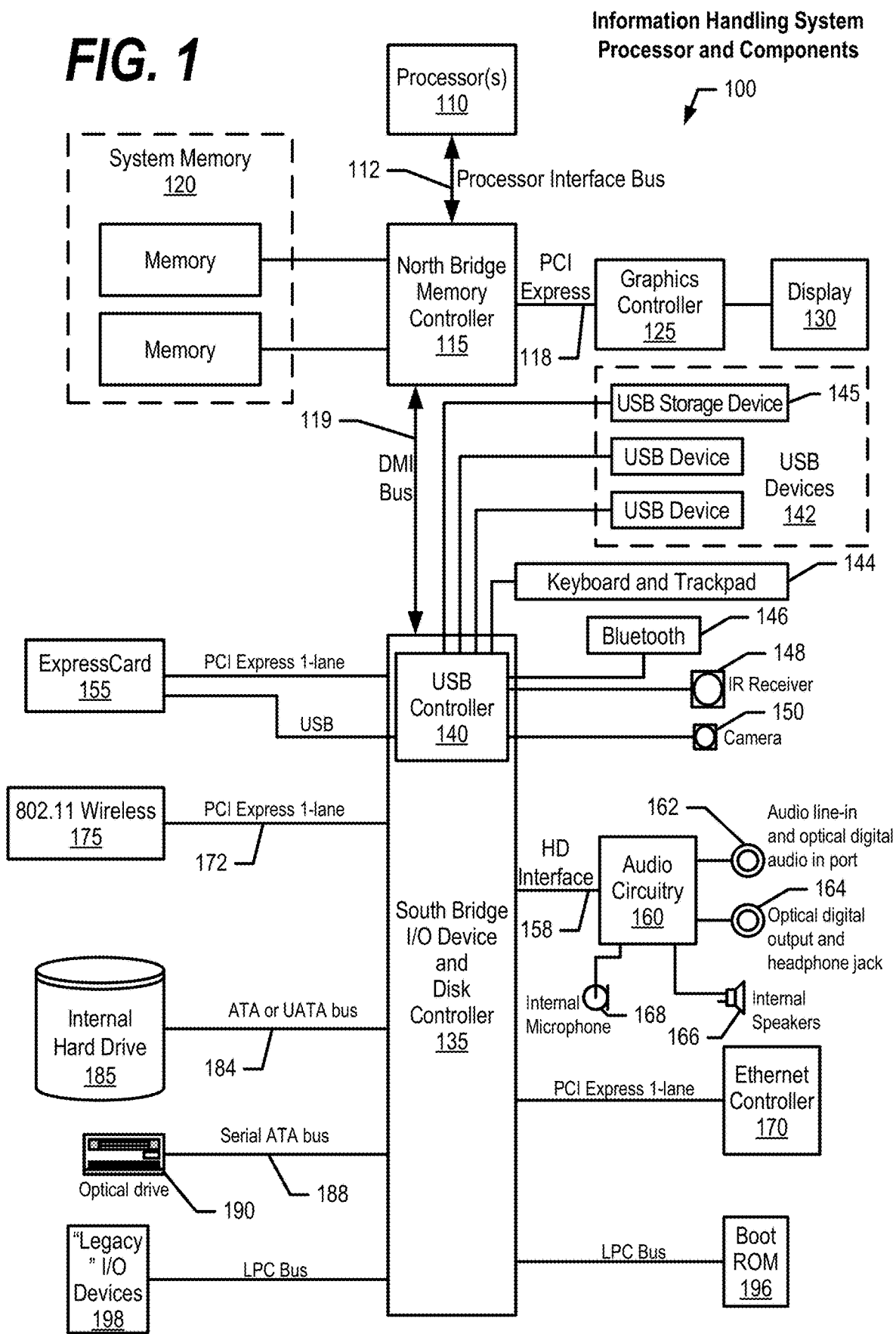
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
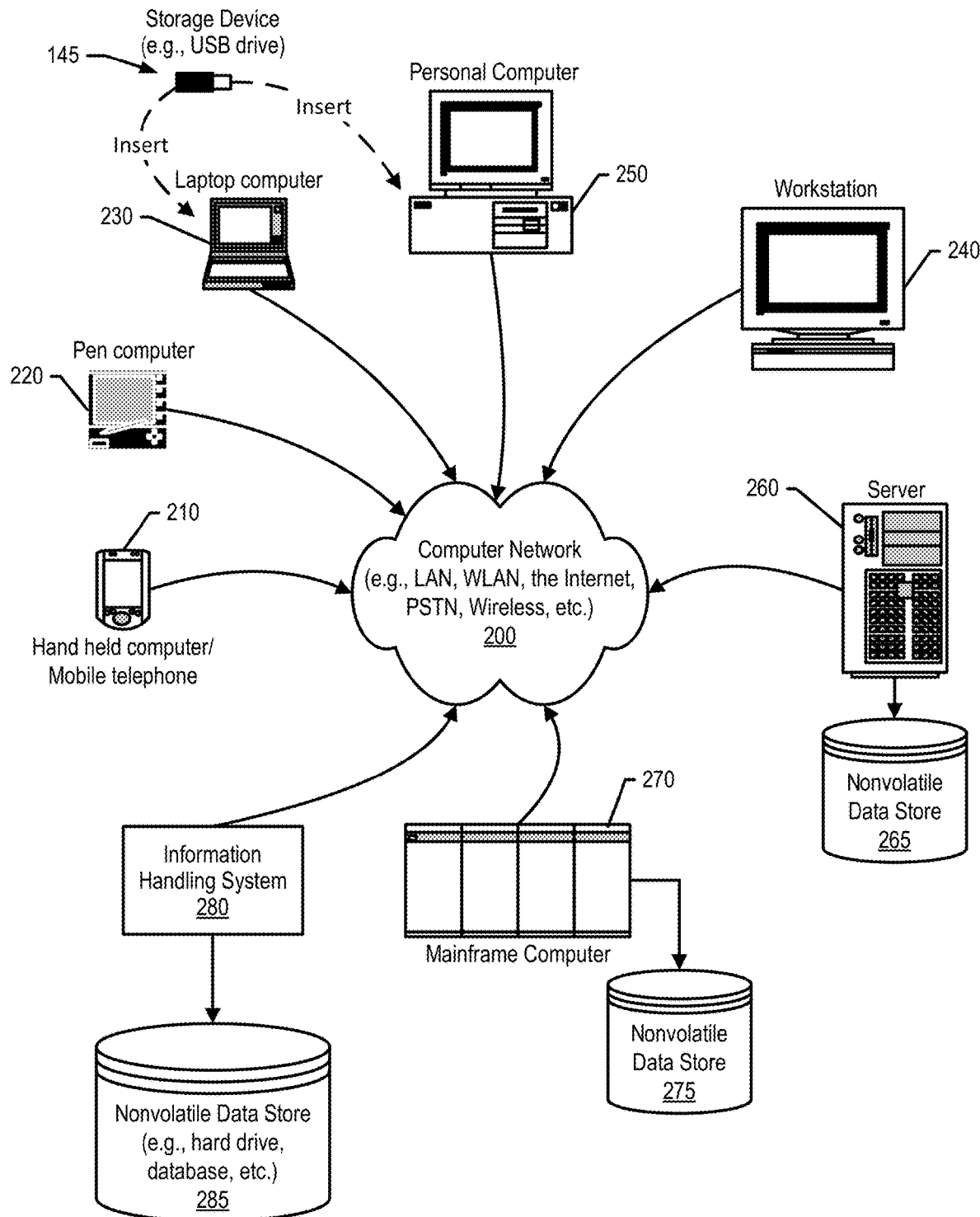
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, internet piracy and illegal file sharing are becoming more and more of a concern. Unfortunately, today's approaches use classical computing approaches to protect data and privacy, which malicious users are capable of hacking. For example, individual users may share digital soft copies of their personal and confidential files over the internet for processing some of their applications. In this example, some of the digital soft copies may be circulated (intentionally or un-intentionally) and land in the hands of malicious users who can misuse the original user's digital copies for illegal transactions or create fake online accounts in commercial or social platforms.

FIGS. 3 through 7 depict an approach that can be executed on an information handling system that uses a combination of photon computing and classical computing to protect sensitive data utilized for upload authorization. A client enhanced security and authenticity system (ESAS) encodes owner information and a security flag with a non-invertible key. The client ESAS then embeds the encoded owner information into a file and sends the file to a cloud network. When an upload site receives a request to upload the file from a requestor, a server ESAS at the upload site interacts with the client ESAS over photon channels and classical channels to establish shared keys using a non-invertible key exchange protocol (KEP). Then, the server ESAS interfaces with the client system over the photon channel and the classical channel using the shared keys to decode the contact information. In turn, the server ESAS sends an upload request to the owner using the contact information. The server ESAS receives a response from the owner and, upon approval, the server ESAS adds an "Authenticated" flag to the file and completes the upload.

Figure 3:
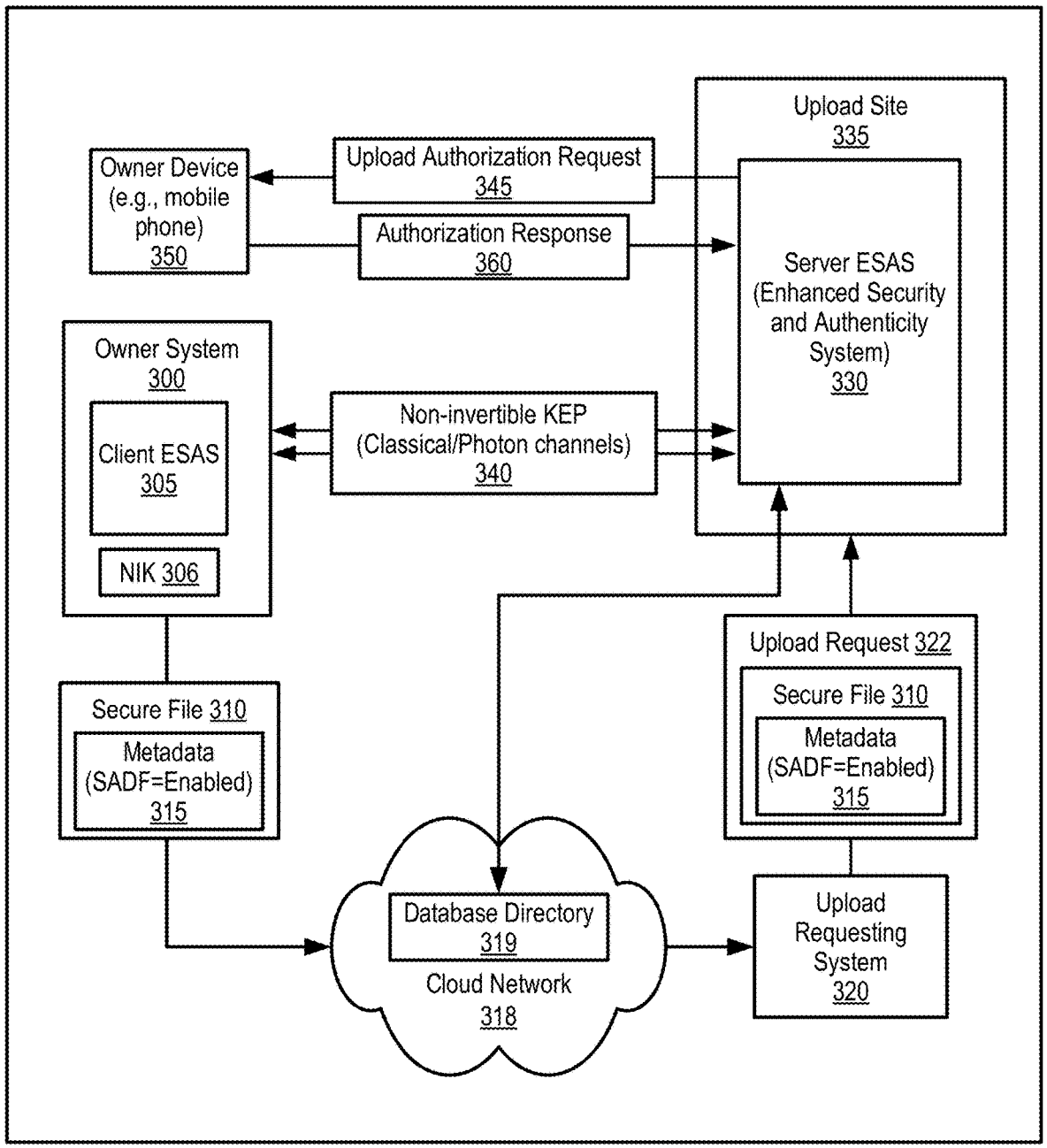
FIG. 3 is an exemplary diagram showing a system that uses photon channels and classical channels along with a non-invertible key exchange protocol to decode file owner information and request file upload approval from the file owner.

FIG. 3 is an exemplary diagram showing a system that uses photon channels and classical channels along with a non-invertible key exchange protocol to decode file owner information and request file upload approval from the file owner.

Owner system 300 includes client enhanced security and authenticity system (ESAS) 305, which interfaces with server ESAS 330 to ensure files created by the owner of owner system 300 are not maliciously uploaded. First, when the owner of owner system 300 wishes to upload a file to cloud network 318, client ESAS 305 proceeds through a series of steps to create secure file 310 by encoding metadata 315 with non-invertible key (NIK) 306 and embedding encoded metadata 315. A non-invertible key is a key where multiple y values can produce the same x value, and a user is required to know which x value to use to properly decode the metadata. In one embodiment, the metadata includes owner information, such as the owner's name and contact information, and a Security Authenticity Detection Flag (SADF) discussed herein (see FIG. 4 and corresponding text for further details).

Client ESAS 305 validates the owner information (e.g., third party verification systems) and sets the SADF flag to "Enabled." In turn, owner system 300 uploads secure file 310 with metadata 315 to cloud network 318 and database directory 319 maintains a directory that maps uploaded secure files with corresponding client ESAS IP addresses.

Then, at some point in the future, upload requesting system 320 wishes to upload secure file 310 to upload site 335 that includes server ESAS 330. When upload site 335 receives upload request 322 from upload requesting system 330, upload site 335 detects the encoded metadata and invokes server ESAS 330 to perform non-invertible key exchange protocol (KEP) 340 over classical channels and photon channels to establish a shared secret key; receive non-invertible key 306 from client ESAS 305 over the photon channel; and decode the owner information in metadata 315.

In one embodiment, server ESAS 330 and client ESAS 305 use exponentiation to exchange a secret key (e.g., Diffie-Hellman) that encrypts/decrypts through invertible multiplication (e.g., ElGamal). In another embodiment, the non-invertible KEP 340 is aimed to establish a shared secret key (ks) between client ESAS 305 and server ESAS 330 through a public channel in the presence of a malicious user. In this embodiment, numbers {pxaka,qyaka,n} and {pxbkb, qybkb,n} along with prime numbers p, q and r are publicly known by client ESAS 305 and server ESAS 330. The values {xi,ki} constitutes a private key of client ESAS 305 and server ESAS 330, respectively. In this embodiment, client ESAS 305 and server ESAS 330 agree to use a module n, so they compute the integers and exchange them through a public channel. Client ESAS 305 and server ESAS 330 perform two operations (e.g., exponentiation and multiplication) over the numbers received. Then, client ESAS 305 and server ESAS 330 apply Euler's theorem to the results of the two operations. Client ESAS 305 sends to server ESAS 330 the resulting value pxbxaqybya*kb mod n who applies $kb^{-1}$ to derive the number pxbxaqybya*mod n. Similarly, server ESAS 330 sends pxaxbqyayb*ka mod n to client ESAS 305 who uses $ka^{-1}$ to get the shared secret key ks=pxaxbqyayb mod n.

In addition, once the shared secret key is established, non-invertible KEP 340 uses photons and light phase shifting to protect sending non-invertible key 306 from client ESAS 305 to server ESAS 330. In one embodiment, non-invertible KEP 340 uses two bases such as 0→|↑> and 0→|→>. In this embodiment, server ESAS 330 maintains a 50% decoding error rate and if the bases increase, so does the sampling rate. After all of the photons are shared between client ESAS 305 and server ESAS 330, server ESAS 330 randomly chooses bases and decodes the signal. Next, client ESAS 305 provides the bases through the classical channel and, for any of the bases that do not match, client ESAS 305 discards the bits.

Non-invertible KEP 340 continues to provide enough samples to ensure the correct values are observed and that all of the base positions are eventually matched. If at any time a malicious user in the middle of communication is discovered though detecting a phase shift change of the light, indicating a malicious user in the middle, non-invertible KEP 340 terminates and notifies upload site 335. As such, the original light is not cloneable or storable without knowing the base used for decoding (see FIG. 7 and corresponding text for further details).

Server ESAS 330 sends a second portion of samples over the classical channel to client ESAS 305 to establish a second shared secret key (two-step authentication). Then, server ESAS 330 interfaces with client ESAS 305 over the classical channel using the second shared secret key to decode the owner contact information.

In one embodiment, server ESAS 330 captures a screen shot of the upload request and any other transaction details, and sends upload authorization request 345 to owner device 350 based on the owner contact information (e.g., mobile phone). The owner reviews upload authorization request 345 and sends authorization response 360 to server ESAS 330, indicating whether the owner approves or disapproves of the upload request.

Server ESAS 330 receives authorization response 360 and, when authorization response 360 indicates owner approval, server ESAS 330 adds an "Authenticated" flag to secure file 310 and completes the upload to upload site 335. If, however, authorization response 360 indicates owner disapproval, then server ESAS 330 notifies upload requesting system 320 that the upload request is not approved (see FIG. 7 and corresponding text for further details).

Figure 4:
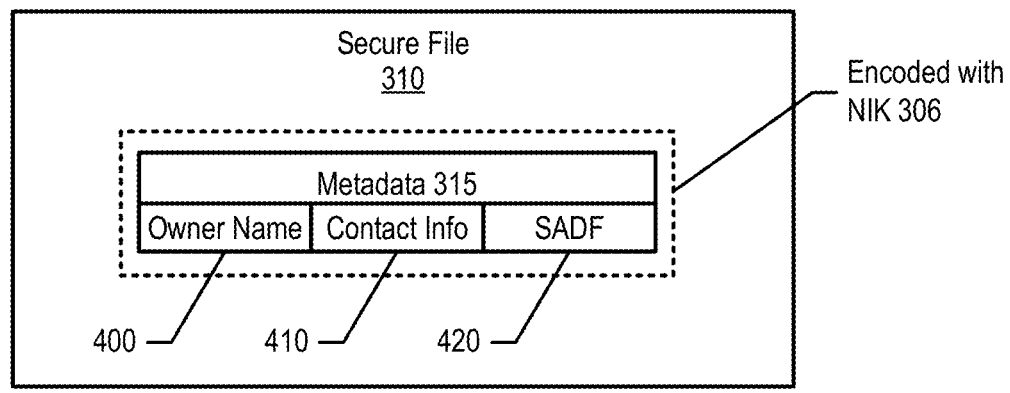
FIG. 4 is an exemplary diagram depicting encoded owner information inserted into a file.

FIG. 4 is an exemplary diagram depicting encoded owner information inserted into a file. Secure file 310 includes metadata 315, which is encoded with non-invertible key 306 and is not visible to a user. In one embodiment, metadata 315 includes owner name 400 of secure file 310, the owner's contact information 410 (e.g., mobile phone, email address, etc.), and Security Authenticity Detection Flag (SADF) flag 420.

In one embodiment, the file owner's name and contact information are validated by respective trusted organizations (e.g., Government approved Telecom Authority of respective countries). When validated, client ESAS 305 sets SADF flag 420 to "Enabled", indicating that secure file 310 is secure and server ESAS 330 should proceed through a security and authorization process with client ESAS 305 when server ESAS 330 receives secure file from upload requesting system 320.

Figure 5:
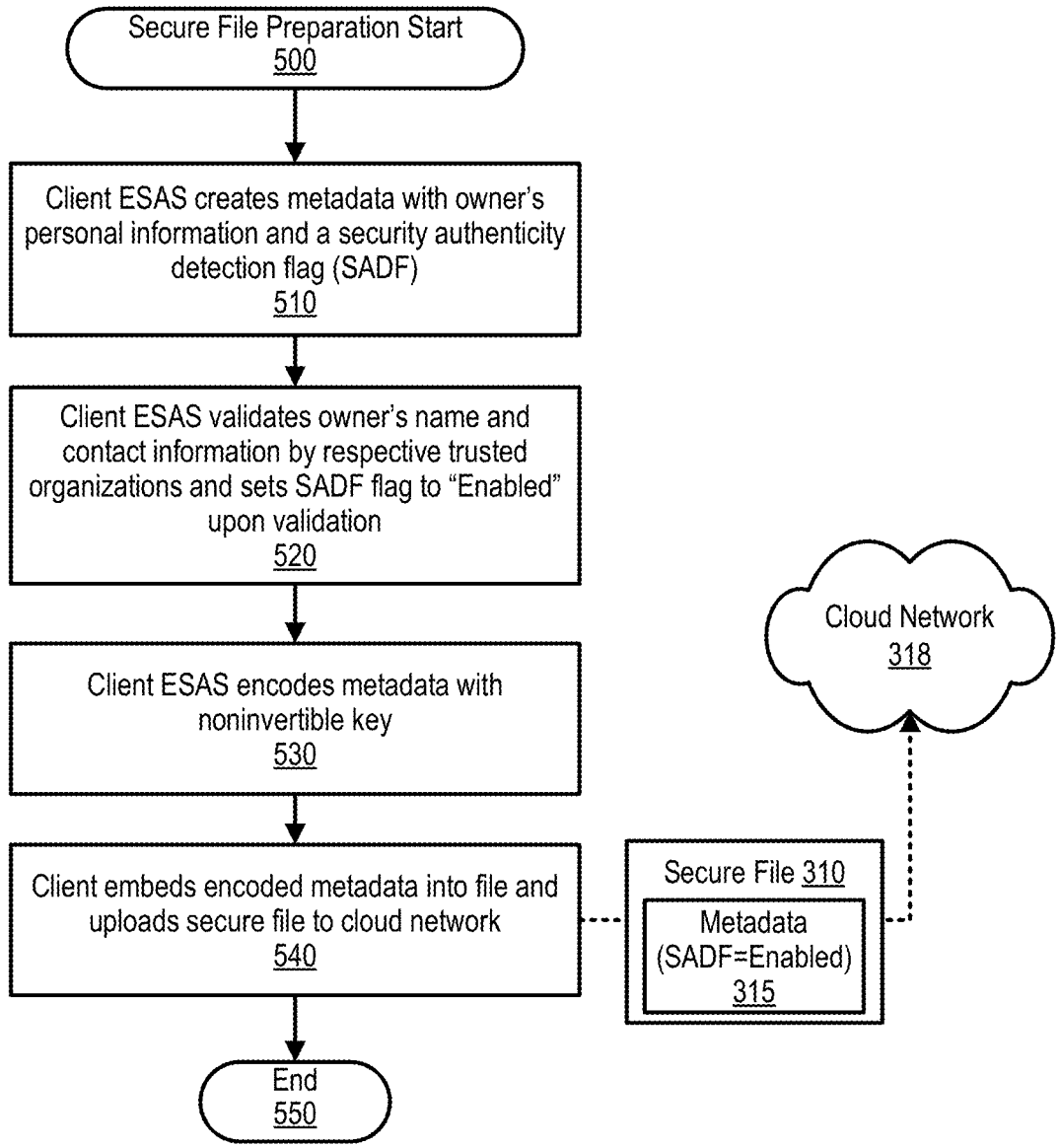
FIG. 5 is an exemplary flowchart showing steps taken by an owner system to create a secure file and upload the secure file to a cloud network.

FIG. 5 is an exemplary flowchart showing steps taken by an owner system to create a secure file and upload the secure file to a cloud network. FIG. 5 processing commences at 500 whereupon, at step 510, client ESAS 305 creates metadata with owner's personal information and a security authenticity detection flag (SADF) (see FIG. 4 and corresponding text for further details).

At step 520, client ESAS 305 validates the owner's name and contact information by respective trusted organizations, and sets the SADF flag to "Enabled" upon validation. At step 530, client ESAS 305 encodes the metadata with a noninvertible key. At step 540, client ESAS 305 embeds encoded metadata 315 into secure file 310 and uploads secure file 310 with encoded metadata 315 to cloud network 318. FIG. 5 processing thereafter ends at 550.

Figure 6:
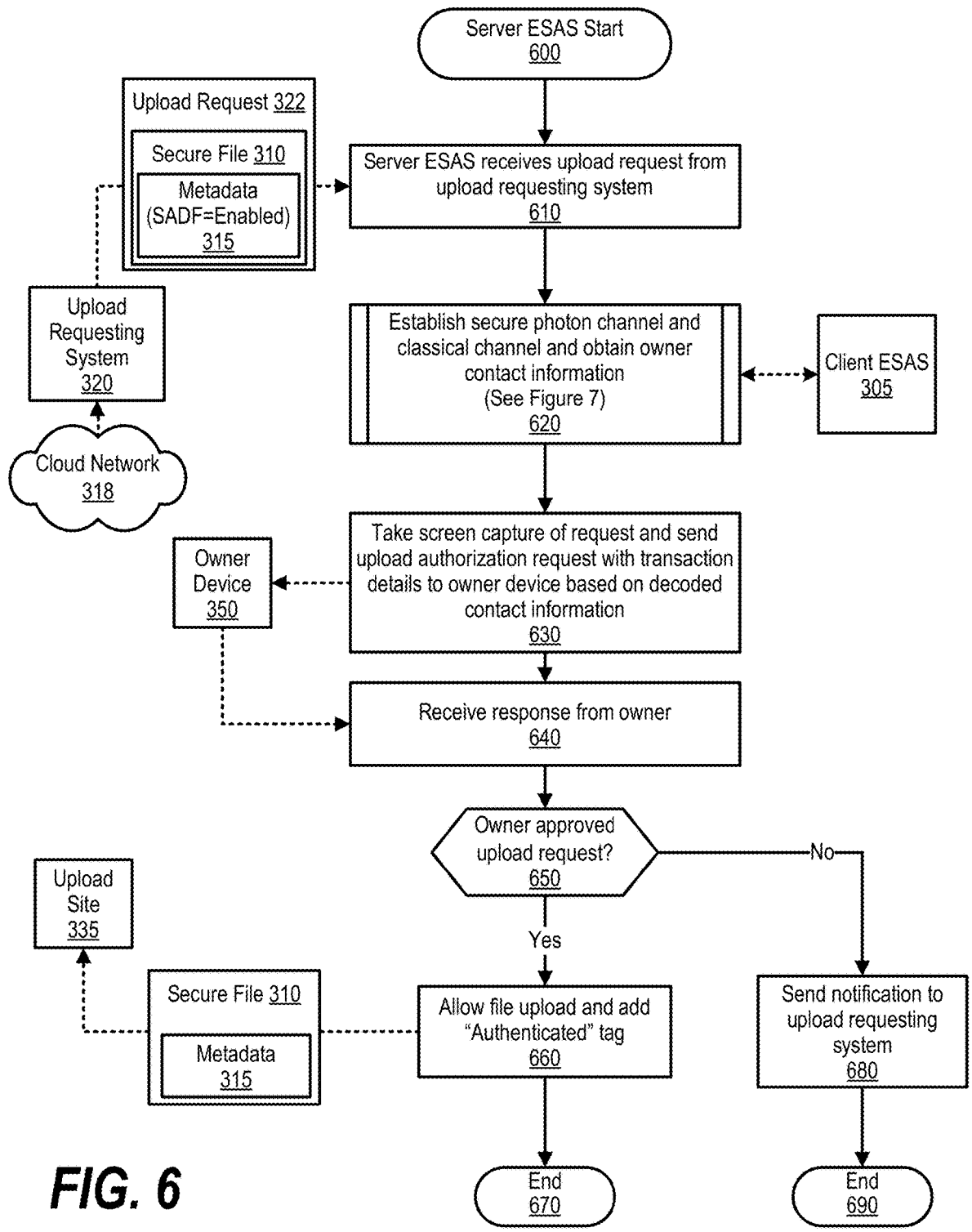
FIG. 6 is an exemplary flowchart showing steps taken by a server Enhanced Security and Authenticity System (ESAS) to interface with a file owner to authenticate an upload of the file by an upload requestor.

FIG. 6 is an exemplary flowchart showing steps taken by a server Enhanced Security and Authenticity System (ESAS) to interface with client ESAS 305 to obtain authorization by a file owner to upload a file. FIG. 6 processing commences at 600 whereupon, at step 610, server ESAS 330 receives upload request 322 from upload requesting system 320 to upload secure file 310. For example, upload requesting system 320 may wish to upload a whitepaper from cloud network 318.

At predefined process 620, server ESAS 330 establishes a secure photon channel and classical channel with client ESAS 305 and obtains owner contact information over the secure channels using non-invertible KEP 340. (see FIG. 7 and corresponding text for processing details).

Once server ESAS 330 decodes the owner contact information, server ESAS 330, at step 630, captures a screen shot of the upload request and sends upload authorization request 345, which includes the screen shot with transaction details, to owner device 350 based on the decoded contact information. For example, the owner contact information may include a mobile phone number or email address of the owner and server ESAS 330 sends upload authorization request 345 to the owner's mobile phone and/or email address. In one embodiment, the owner may negotiate financial terms with upload requesting system 320 and agree upon a payment amount to authorize the upload request.

At step 640, server ESAS 330 receives authorization response 360 from owner device 350 indicating whether the owner approves or rejects the upload request by upload requesting system 320. At decision 650, server ESAS 330 determines as to whether the owner approved the upload request. If the owner approved the upload request, then decision 640 branches to the 'yes' branch whereupon, at step 660, server ESAS 330 allows the upload of secure file 310 into upload site 335 and adds a separate "Authenticated" tag as a security checkmark to indicate the uploaded file is successfully authenticated by the file owner. FIG. 6 processing thereafter ends at 670.

On the other hand, if the owner does not approve the upload request, then decision 640 branches to the 'no' branch whereupon, at step 680, server ESAS 330 sends a notification to upload requesting system 320 that the upload request is rejected. FIG. 6 processing thereafter ends at 690.

Figure 7:
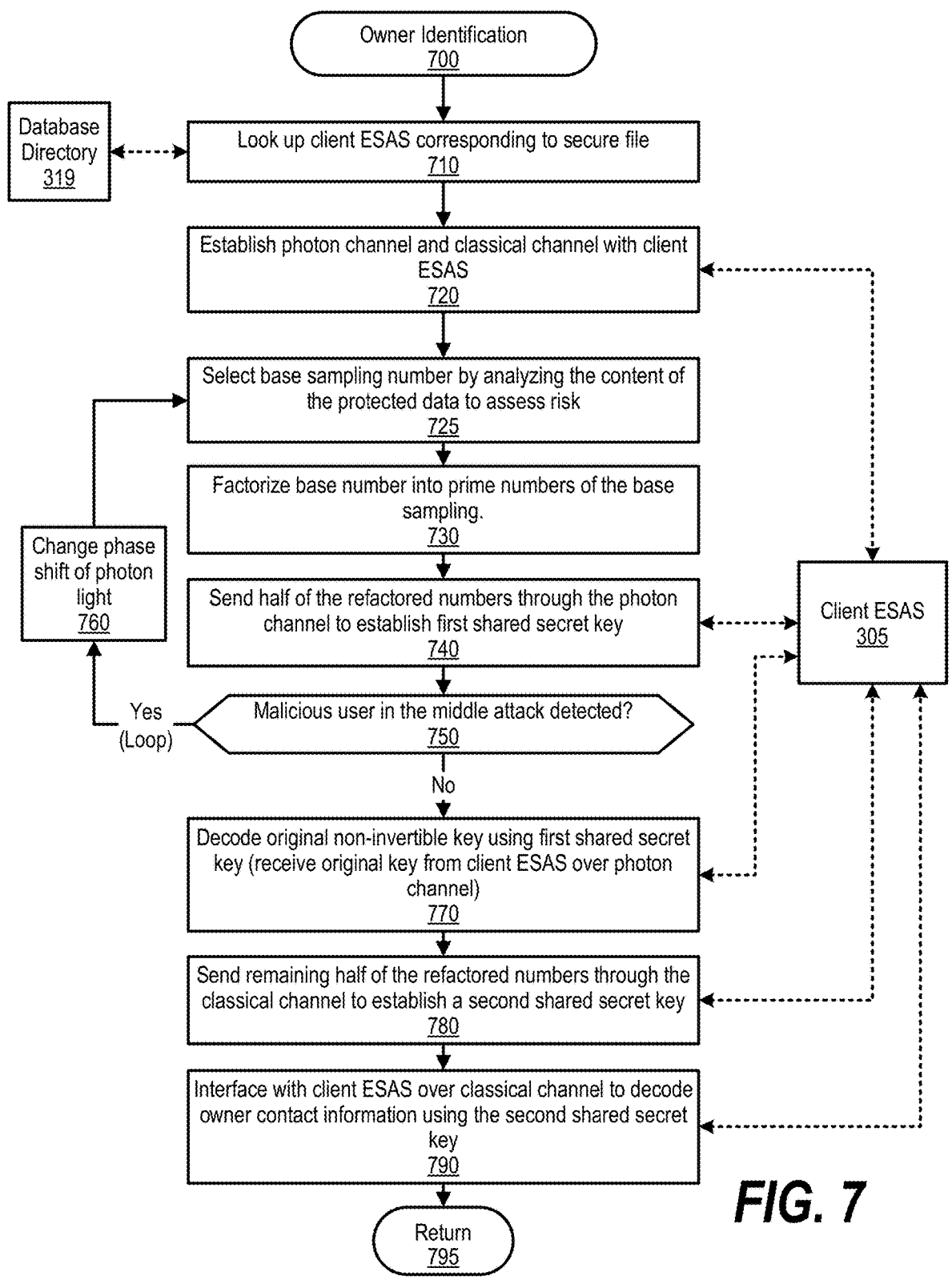
FIG. 7 is an exemplary flowchart showing steps taken by a server ESAS to interface with a client ESAS to decode owner contact information.

FIG. 7 is an exemplary flowchart showing steps taken by a server ESAS to interface with a client ESAS to establish a shared secret key and use the shared secret key to send non-invertible key 306 over the photon channel, which server ESAS 330 uses to decode metadata 315. FIG. 7 server ESAS 330 processing commences at 700 whereupon, at step 710, server ESAS 330 looks up client ESAS 305 in database directory 310 corresponding to secure file 310 in upload request 322.

At step 720, server ESAS 330 establishes a photon channel and classical channel with client ESAS 305 to perform non-invertible KEP 340. At step 725, server ESAS 330 selects a base sampling number by analyzing the content of the secure file 310 to assess risk. At step 730, server ESAS 330 factorizes the base number into prime numbers of the base sampling. At step 740, server ESAS 330 sends half of the refactored numbers (e.g., combination of factorized base sampling numbers and prime numbers) through the photon channel to establish a first shared secret key.

Server ESAS 330 determines as to whether a malicious user in the middle attack is detected (decision 750). If a malicious user in the middle attack is detected, then decision 750 branches to the 'yes' branch which loops back to step 760, whereby server ESAS 330 changes phase shift of photon light and proceeds through steps 725-740. This looping continues until a malicious user in the middle attack is not detected, at which point decision 750 branches to the 'no' branch exiting the loop.

At step 770, server ESAS 330 receives the non-invertible key 306 from client ESAS 305 over the photon channel and decodes non-invertible key 306 using the first shared secret key from step 740 above. At step 780, server ESAS 330 sends the remaining half of the refactored numbers through the classical channel to establish a second shared secret key. At step 790, server ESAS 330 interfaces with client ESAS 305 over the classical channel to decode the owner contact information using the second shared secret key. FIG. 7 processing thereafter returns to the calling routine (see FIG. 6) at 795.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A computer-implemented method comprising:
receiving, at a server system, a request to upload a file comprising metadata that is encoded with a non-invertible key, wherein the metadata comprises contact information corresponding to an owner of the file;
establishing both a photon channel and a classical channel between the server system and a client system, wherein the photon channel and the classical channel are secured using one or more shared secret keys;
selecting, by the server system, a base sampling number, by analyzing a content of the file;
factorizing the base sampling number into a set of prime numbers by the server system, wherein the factorizing generates a set of refactored numbers;
sending a first subset of the refactored numbers from the server system to the client system over the photon channel to establish a non-invertible key exchange protocol communication using a first one of the one or more shared secret keys;
interfacing with the client system over the photon channel and the classical channel to decode the contact information at the server system;
sending an upload request from the server system to the owner of the file using the decoded contact information; and
authorizing the upload request at the server system in response to receiving an upload approval from the owner.

2. The computer-implemented method of claim 1 further comprising:
changing a phase shift of photon light to transmit over the photon channel in response to detecting a malicious user in the middle attack while establishing the non-invertible key exchange protocol communication using the first shared secret key;
selecting, by the server system, a different base sampling number by further analyzing the content of the file;
factorizing the different base sampling number into a set of different prime numbers to generate a set of different refactored numbers; and
sending a subset of the set of different refactored numbers from the server system to the client system over the photon channel to establish a different non-invertible key exchange protocol communication using a different one of the one or more shared secret keys.

3. The computer-implemented method of claim 1 further comprising:
decoding, by the server system, the non-invertible key over the photon channel using the first shared secret key;
sending a second subset of the refactored numbers from the server system to the client system over the classical channel to re-establish the non-invertible key exchange protocol communication using a second one of the one or more shared secret keys; and
interfacing with the client system, by the server system, over the classical channel using the second shared secret key to decode the owner contact information.

4. The computer-implemented method of claim 1 further comprising:
comparing, by the client system, the first subset of the refactored numbers with a random set of bases; and
discarding one or of the random set of bases that do not match at least one of the first subset of the refactored numbers.

5. The computer-implemented method of claim 1 wherein, prior to receiving the request to upload the file, the method further comprises:
setting, by the client system, a security authenticity detection flag in the metadata to a value of enabled in response to validating the owner contact information by the client system;
uploading the file comprising the encoded metadata to a cloud network;
retrieving the file comprising the encoded metadata from the cloud network by an upload requesting system; and
sending, by the upload requesting system, the request to upload the file to the server system.

6. The method of claim 5 further comprising:
sending the upload request to the owner of the file by the server system in response to detecting the security authenticity flag is set to enabled;
inserting an authenticated tag into the file in response to authorizing the upload request; and
uploading the file with the authenticated flag to an upload site.

7. An information handling system comprising:
one or more processors;
a memory coupled to at least one of the processors;
a set of computer program instructions stored in the memory and executed by at least one of the processors in order to perform actions of:
receiving, at a server system, a request to upload a file comprising metadata that is encoded with a non-invertible key, wherein the metadata comprises contact information corresponding to an owner of the file;
establishing both a photon channel and a classical channel between the server system and a client system, wherein the photon channel and the classical channel are secured using one or more shared secret keys;
selecting, by the server system, a base sampling number, by analyzing a content of the file;
factorizing the base sampling number into a set of prime numbers by the server system, wherein the factorizing generates a set of refactored numbers;
sending a first subset of the refactored numbers from the server system to the client system over the photon channel to establish a non-invertible key exchange protocol communication using a first one of the one or more shared secret keys;
interfacing with the client system over the photon channel and the classical channel to decode the contact information at the server system;
sending an upload request from the server system to the owner of the file using the decoded contact information; and
authorizing the upload request at the server system in response to receiving an upload approval from the owner.

8. The information handling system of claim 7 wherein the processors perform additional actions comprising:
changing a phase shift of photon light to transmit over the photon channel in response to detecting a malicious user in the middle attack while establishing the first shared key;
changing a phase shift of photon light to transmit over the photon channel in response to detecting a malicious user in the middle attack while establishing the non-invertible key exchange protocol communication using the first shared secret key;

selecting, by the server system, a different base sampling number by further analyzing the content of the file;

factorizing the different base sampling number into a set of different prime numbers to generate a set of different refactored numbers; and sending a subset of the set of different refactored numbers from the server system to the client system over the photon channel to establish a different non-invertible key exchange protocol communication using a different one of the one or more shared secret keys.

9. The information handling system of claim 7 wherein the processors perform additional actions comprising:

decoding, by the server system, the non-invertible key over the photon channel using the first shared secret key;

sending a second subset of the refactored numbers from the server system to the client system over the classical channel to re-establish the non-invertible key exchange protocol communication using a second one of the one or more shared secret keys; and interfacing with the client system, by the server system, over the classical channel using the second shared secret key to decode the owner contact information.

10. The information handling system of claim 7 wherein the processors perform additional actions comprising:

comparing, by the client system, the first subset of the refactored numbers with a random set of bases; and discarding one or of the random set of bases that do not match at least one of the first subset of the refactored numbers.

11. The information handling system of claim 7 wherein, prior to receiving the request to upload the file, the processors perform additional actions comprising:

setting, by the client system, a security authenticity detection flag in the metadata to a value of enabled in response to validating the owner contact information by the client system;

uploading the file comprising the encoded metadata to a cloud network;

retrieving the file comprising the encoded metadata from the cloud network by an upload requesting system; and sending, by the upload requesting system, the request to upload the file to the server system.

12. The information handling system of claim 11 wherein the processors perform additional actions comprising:

sending the upload request to the owner of the file by the server system in response to detecting the security authenticity flag is set to enabled;

inserting an authenticated tag into the file in response to authorizing the upload request; and uploading the file with the authenticated flag to an upload site.

13. A computer readable storage medium storing a computer program product comprising computer program code that, when executed by an information handling system, causes the information handling system to perform actions comprising:

receiving, at a server system, a request to upload a file comprising metadata that is encoded with a non-invertible key, wherein the metadata comprises contact information corresponding to an owner of the file;

establishing both a photon channel and a classical channel between the server system and a client system, wherein the photon channel and the classical channel are secured using one or more shared secret keys;

selecting, by the server system, a base sampling number, by analyzing a content of the file;

factorizing the base sampling number into a set of prime numbers by the server system, wherein the factorizing generates a set of refactored numbers;

sending a first subset of the refactored numbers from the server system to the client system over the photon channel to establish a non-invertible key exchange protocol communication using a first one of the one or more shared secret keys;

interfacing with the client system over the photon channel and the classical channel to decode the contact information at the server system;

sending an upload request from the server system to the owner of the file using the decoded contact information; and authorizing the upload request at the server system in response to receiving an upload approval from the owner.

14. The computer readable storage medium of claim 13 wherein the information handling system performs further actions comprising:

changing a phase shift of photon light to transmit over the photon channel in response to detecting a malicious user in the middle attack while establishing the non-invertible key exchange protocol communication using the first shared secret key;

selecting, by the server system, a different base sampling number by further analyzing the content of the file;

factorizing the different base sampling number into a set of different prime numbers to generate a set of different refactored numbers; and sending a subset of the set of different refactored numbers from the server system to the client system over the photon channel to establish a different non-invertible key exchange protocol communication using a different one of the one or more shared secret keys.

15. The computer readable storage medium of claim 13 wherein the information handling system performs further actions comprising:

decoding, by the server system, the non-invertible key over the photon channel using the first shared secret key;

sending a second subset of the refactored numbers from the server system to the client system over the classical channel to re-establish the non-invertible key exchange protocol communication using a second one of the one or more shared secret keys; and interfacing with the client system, by the server system, over the classical channel using the second shared secret key to decode the owner contact information.

16. The computer readable storage medium of claim 13 wherein the information handling system performs further actions comprising:

comparing, by the client system, the first subset of the refactored numbers with a random set of bases; and discarding one or of the random set of bases that do not match at least one of the first subset of the refactored numbers.

17. The computer readable storage medium of claim 13 wherein, prior to receiving the request to upload the file, the information handling system performs further actions comprising:

setting, by the client system, a security authenticity detection flag in the metadata to a value of enabled in response to validating the owner contact information by the client system;

uploading the file comprising the encoded metadata to a cloud network;

retrieving the file comprising the encoded metadata from the cloud network by an upload requesting system;

sending, by the upload requesting system, the request to upload the file to the server system.

* * * * *